United States Patent
Tajbakhsh (10) Patent No.: US 10,211,017 B2
(45) Date of Patent: Feb. 19, 2019

(54) HIGH VOLTAGE RELAY SYSTEMS AND METHODS

(71) Applicant: Microsemi Corporation, Aliso Viejo, CA (US)

(72) Inventor: Syrus Tajbakhsh, Anaheim, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 0 days.

(21) Appl. No.: 15/232,729

(22) Filed: Aug. 9, 2016

(65) Prior Publication Data

US 2017/0040133 A1 Feb. 9, 2017

Related U.S. Application Data

(60) Provisional application No. 62/202,902, filed on Aug. 9, 2015, provisional application No. 62/202,905, filed on Aug. 9, 2015.

(51) Int. Cl.
*H01F 7/08* (2006.01)
*H01H 50/64* (2006.01)
(Continued)

(52) U.S. Cl.
CPC ........... *H01H 50/645* (2013.01); *B01D 53/04* (2013.01); *H01H 50/023* (2013.01);
(Continued)

(58) Field of Classification Search
CPC ......................... H01H 33/6664; H01H 50/047
(Continued)

(56) References Cited

U.S. PATENT DOCUMENTS 2,749,403 A * 6/1956 Horman ................. H01H 50/20
174/50.54
2,916,584 A * 12/1959 Molyneux .............. H01H 51/01
200/246

(Continued)

FOREIGN PATENT DOCUMENTS

FR 2502389 9/1982
FR 2622739 5/1989

OTHER PUBLICATIONS

Invitation to Pay Additional Fees and Where Applicable Protest Fees, Issued on Oct. 26, 16 by the International Searching Authority for related PCT Application No. PCT/US2016/046204.

(Continued)

*Primary Examiner* — Alexander Talpalatski
(74) *Attorney, Agent, or Firm* — Simon Kahn (57) ABSTRACT

Various high voltage systems may benefit from a suitable relay system. For example, a relay box may be provided with a shock and vibration resistant arrangement including a sealed coil box within the sealed relay box. For example, an apparatus can include a coil box containing coils, inside pole pieces, and permanent magnets, wherein the coils, inside pole pieces, and permanent magnets can be configured to actuate an armature assembly external to the coil box. The apparatus can also include outside pole pieces configured to move a relay armature of the armature assembly responsive to energizing of the coils. Moving the relay armature can include overcoming a latching of at least one of the permanent magnets.

20 Claims, 10 Drawing Sheets

(51) Int. Cl.
*H01H 50/02* (2006.01)
*H01H 50/24* (2006.01)
*H01H 51/01* (2006.01)
*H01H 51/28* (2006.01)
*B01D 53/04* (2006.01)
*H01H 50/04* (2006.01)
*H01H 50/44* (2006.01)
*H01H 51/29* (2006.01)

(52) U.S. Cl.
CPC .......... *H01H 50/026* (2013.01); *H01H 50/04* (2013.01); *H01H 50/24* (2013.01); *H01H 50/443* (2013.01); *H01H 51/01* (2013.01); *H01H 51/285* (2013.01); *H01H 51/29* (2013.01); *H01H 2239/046* (2013.01)

(58) Field of Classification Search
USPC .................. 335/136, 128, 229, 181, 230
See application file for complete search history.

(56) References Cited

U.S. PATENT DOCUMENTS

| | | | | |
|---|---|---|---|---|
| 3,048,678 A * | 8/1962 | Reed | H01H 51/12 | 335/80 |
| 3,124,671 A * | 3/1964 | Juptner | H01H 1/645 | 335/125 |
| 3,138,677 A | 6/1964 | Adams | | |
| 3,503,019 A * | 3/1970 | Kussy | H01H 50/045 | 335/193 |
| 3,517,358 A | 6/1970 | Davis | | |
| 3,663,908 A * | 5/1972 | Kane | H01H 50/305 | 335/193 |
| 3,745,496 A * | 7/1973 | Tichy | H01H 50/42 | 335/230 |
| 3,906,416 A * | 9/1975 | Sprando | H01H 50/16 | 335/125 |
| 3,968,470 A * | 7/1976 | Brown | H01H 51/2281 | 335/230 |
| 4,039,984 A * | 8/1977 | DeLucia | H01H 1/58 | 335/151 |
| 4,168,480 A * | 9/1979 | De Lucia | H01H 33/021 | 174/17 GF |
| 4,286,244 A * | 8/1981 | Schuessler | H01H 51/2281 | 335/230 |
| 4,302,742 A * | 11/1981 | Schedele | H01H 50/026 | 335/135 |
| 4,404,443 A * | 9/1983 | Coynel | H01H 1/62 | 218/23 |
| 4,429,198 A * | 1/1984 | Mori | H01H 9/46 | 218/149 |
| 4,463,331 A | 7/1984 | Hurter | | |
| 4,521,655 A * | 6/1985 | Okado | H01H 9/48 | 218/148 |
| 4,998,082 A * | 3/1991 | Duimstra | H01H 50/04 | 200/302.1 |
| 5,337,029 A | 8/1994 | Nobutki et al. | | |
| 6,002,312 A | 12/1999 | Dittmann et al. | | |
| 6,337,612 B1 * | 1/2002 | Kim | H01H 51/2209 | 335/229 |
| 7,078,832 B2 * | 7/2006 | Inagaki | F04B 35/045 | 310/12.19 |
| 7,868,720 B2 * | 1/2011 | Bush | H01H 50/023 | 200/16 A |
| 7,876,183 B2 * | 1/2011 | Uruma | H01H 50/04 | 335/126 |
| 7,944,333 B2 * | 5/2011 | Swartzentruber | H01H 50/023 | 335/202 |
| 8,164,404 B2 * | 4/2012 | Kamiya | H01H 9/04 | 218/157 |
| 8,222,980 B2 * | 7/2012 | Yamagata | H01H 50/023 | 335/126 |
| 8,692,634 B2 * | 4/2014 | Yuba | H01R 13/70 | 200/51.09 |
| 2007/0046406 A1 * | 3/2007 | Matsuoka | F16F 13/10 | 335/202 |
| 2008/0122562 A1 | 5/2008 | Bush et al. | | |
| 2009/0102586 A1 | 4/2009 | Bush et al. | | |
| 2009/0114622 A1 | 5/2009 | Bush et al. | | |
| 2010/0052830 A1 * | 3/2010 | Shinoura | H01H 43/022 | 335/202 |
| 2013/0285774 A1 * | 10/2013 | Hasegawa | H01H 3/28 | 335/189 |

OTHER PUBLICATIONS

Notification of Transmittal of the International Search Report and The Written Opinion of the International Searching Authority, or The Declaration dated Feb. 15, 2017 by the European Patent Office.
Notification Concerning Transmittal of International Preliminary Report on Patentability dated Feb. 22, 2018 by the International Bureau of WIPO on related international patent application PCT/US2016/046204.

* cited by examiner

HIGH VOLTAGE RELAY SYSTEMS AND METHODS

CROSS-REFERENCE TO RELATED APPLICATIONS

This application is related to and claims the benefit and priority of U.S. Provisional Patent Application No. 62/202,902, filed Aug. 9, 2015, which is hereby incorporated herein by reference in its entirety. This application is also related to and claims the benefit and priority of U.S. Provisional Patent Application No. 62/202,905, filed Aug. 9, 2015, which is hereby incorporated herein by reference in its entirety.

BACKGROUND

Field

Various high voltage systems may benefit from a suitable relay system. For example, a relay box may be provided with a shock and vibration resistant arrangement including a sealed coil box within the sealed relay box. The relay box may further be provided with a getter arranged to absorb a virtual leak of gas molecules into the switch cavity through weld joints or permeating through relay case metal walls. The getter can also be arranged to survive shock and vibration without releasing particles into the sealed relay box.

Description of the Related Art

A variety of high voltage systems may include various relay components. Conventional high voltage relays rely on sealing the coil compartment away from the contact assembly or switching compartment. However, these relays have a minimal shock and vibration capability inherent to their design. Conventional relays enclose the entire coil and contact assembly in one compartment without regard for separately sealing the interior components. Thus, any outgassing that may occur from coil wires will degrade the high voltage capability of the relay and render the relay not suited for high voltage applications.

Furthermore, in certain conventional systems, at least one position of the relay requires constant power to maintain the relay in that position. For example, a spring may bias a relay to a first position but may require an active electromagnet to remain in a second position. In conventional latching relays two permanent magnets are used, one for each position to hold the armature in place in position.

High voltage relays suffer from arcing, and thus it is important to ensure that no contamination occur in the area of the high voltage switching. Unfortunately, over time, gas molecules leak into the switch cavity through weld joints, permeate through relay case metal walls, or outgas from the various components results in early failure of such high voltage systems.

SUMMARY

According to certain embodiments, an apparatus can include a coil box containing coils, inside pole pieces, and permanent magnets. The coils, inside pole pieces, and permanent magnets can be configured to actuate an armature assembly external to the coil box. The apparatus can also include outside pole pieces configured to move a relay armature of the armature assembly responsive to energizing of the coils, wherein moving the relay armature includes overcoming a latching of at least one of the permanent magnets.

In certain embodiments, a method can include installing, within a coil box, coils, inside pole pieces, and permanent magnets. The coils, inside pole pieces, and permanent magnets can be configured to actuate an armature assembly external to the coil box. The method can also include installing, exterior to the coil box, outside pole pieces configured to move a relay armature of the armature assembly responsive to energizing of the coils, wherein moving the relay armature includes overcoming a latching of at least one of the permanent magnets.

BRIEF DESCRIPTION OF THE DRAWINGS

For proper understanding of the invention, reference should be made to the accompanying drawings, wherein.

DETAILED DESCRIPTION

Figure 1:
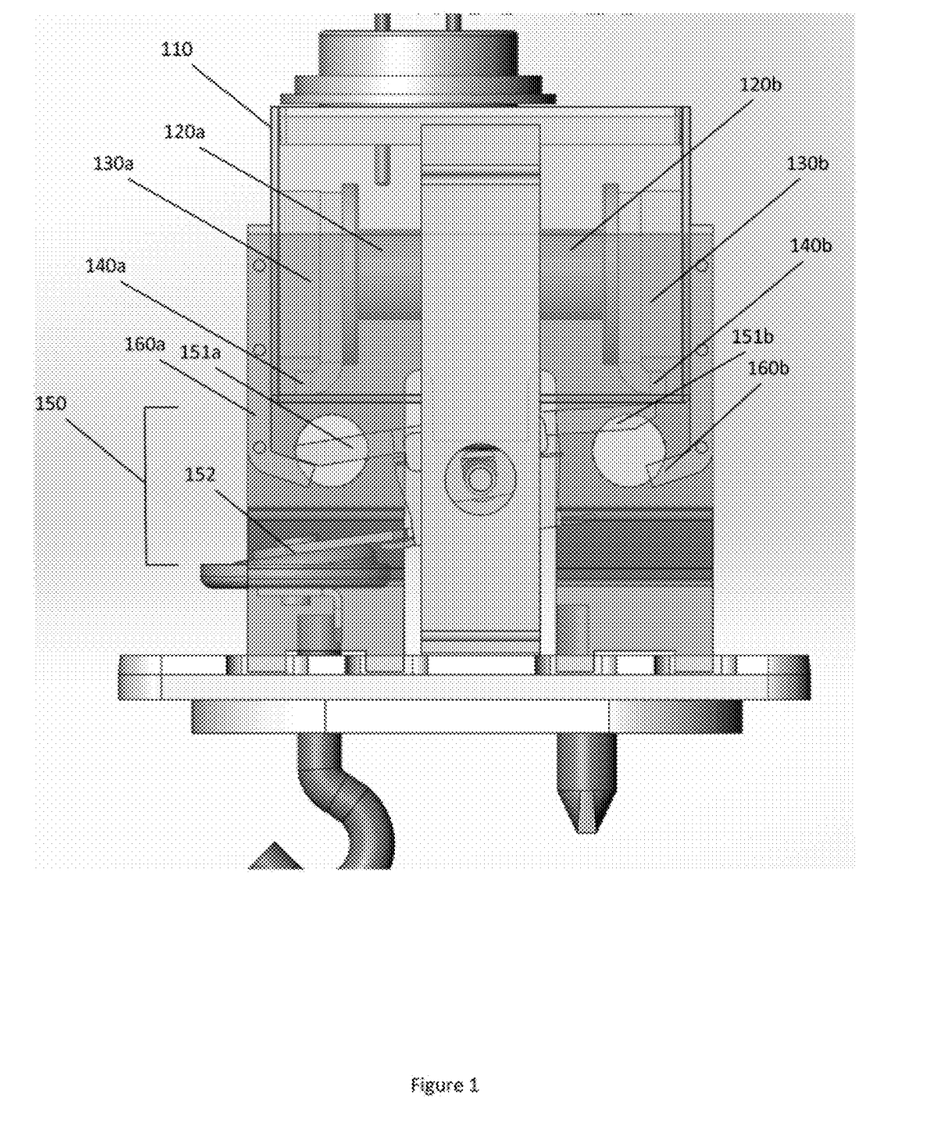
FIG. 1 illustrates an apparatus according to certain embodiments.

Certain embodiments relate to an apparatus that can be used in connection with a high voltage relay system or method. For example, certain embodiments of the present invention can enclose and hermetically seal a coil assembly within a switching compartment, thereby preventing any outgassing of the coil assembly from leaking into the switch compartment and degrading the high voltage capability of the relay. FIG. 1 illustrates an apparatus according to certain embodiments. As shown, for example, in FIG. 1, an apparatus can include a coil box 110 containing coils 120a, 120b, inside pole pieces 130a, 130b, and permanent magnets 140a, 140b. The coils 120a, 120b, inside pole pieces 130a, 130b, and permanent magnets 140a, 140b can be configured to actuate an armature assembly 150 external to the coil box 110.

Coils 120a, 120b can include multiple coils. Thus, for example, coils 120a may comprise two or more coils and coils 120b may comprise two or more coils. Alternatively, coils 120a, 120b can be one coil each.

The apparatus shown by way of example in FIG. 1 can also include outside pole pieces 160a, 160b configured to move a relay armature 152 of the armature assembly 150 responsive to energizing of the coils 120a, 120b. Moving the relay armature 152 can include overcoming a latching of at least one of the permanent magnets 140a, 140b. The arrangement of FIG. 1 shows the relay armature 152 in a closed position, with permanent magnet 140b holding the relay armature 152 in place. If coil 120b were energized, the latching force of permanent magnet 140b could be over-come, and the relay armature 152 could move into an open position, with permanent magnet 140a latching the relay armature 152 in place in the open position.

As shown in FIG. 1, each outside pole piece 160a, 160b can be configured to operate with a gap between the outside pole piece 160a, 160b and the relay armature 152.

Thus, the outside pole pieces 160a, 160b and inside pole pieces 130a, 130b within coil box 110 can be configured to actuate a movable contact of the armature assembly 150. The armature assembly 150 can include a ceramic insulator attached via rivets to a movable contact blade and attached to an armature via a pivot pin holder to the pin. Furthermore all metal surfaces or metallic features including, for example, pivot pin, frame, armature, coil box, and magnetic poles that come in contact with each other during cycling and vibration in hard vacuum can be selected so that they do not stick to each other and bind the operation of the relay. A combination of coatings can be selected for this purpose, including Titanium Carbonitride (TiCN), Molybdenum Disulfide (MoS2), Ion plated silver (IPS), and Electro-less Nickel (eNi). More specifically, MoS2 and/or IPS can be applied to the coil box and outside pole inner surfaces with thickness 1 to 4 microns. Similarly, TiCN and/or eNi coatings can be applied to armature with 1-4 micron thickness. These materials can be switched, or other similar materials may be used. Surface treatments or oxidizations, or other techniques for limiting or avoiding cold welding under hard vacuum are also permitted. The pivoting action of the armature as controlled by the electromagnetic force exerted on the armature can pull in and or drop out the movable contacts to make or break the connection to the stationary terminal attached to the relay terminal pins.

The coil box 110 can be configured to limit motion of the armature assembly 150. For example, a bottom of coil box 110 can impede motion of upper arms 151a, 151b of the armature assembly 150. By contrast, it is not necessary that upper arms 151a, 151b come into contact with outside pole pieces 160a, 160b.

The outside pole pieces 160a, 160b can be attached to at least one exterior wall of the coil box 110. Moreover, the inside pole pieces 130a, 130b can each be attached to at least one respective magnetic core of at least one of the coils 120a, 120b inside the coil box 110.

The at least two permanent magnets 140a, 140b can be secured inside the coil box 110 and in contact with a respective side and bottom face of the coil box 110.

Figure 2:
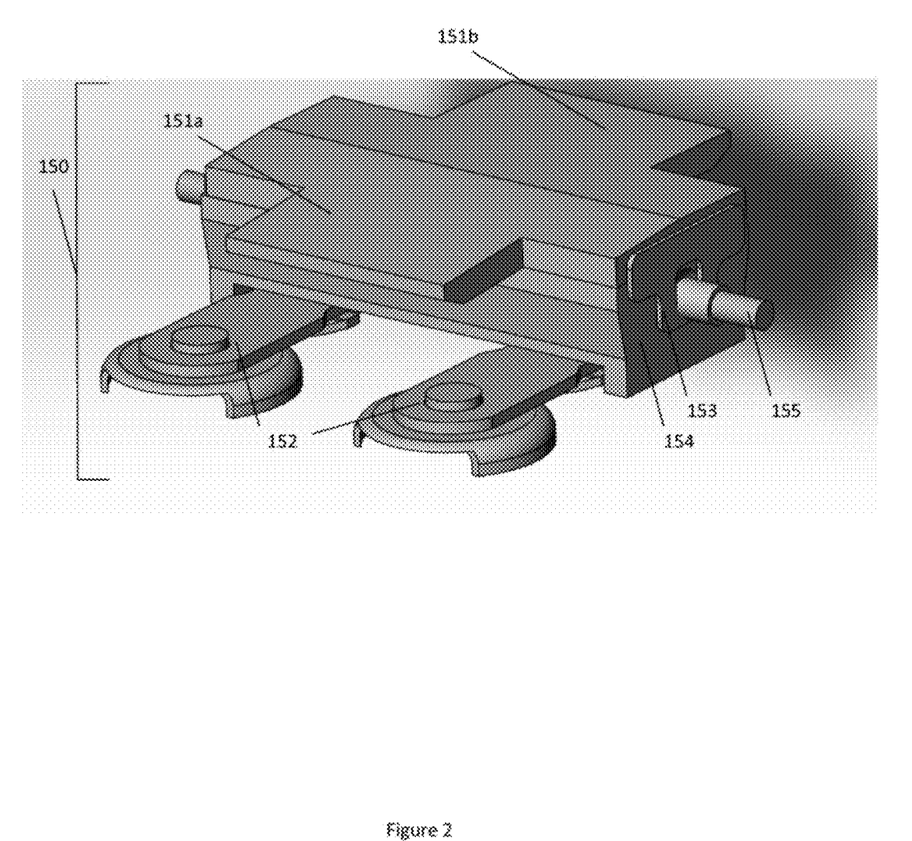
FIG. 2 illustrates detail of an armature assembly according to certain embodiments.

FIG. 2 illustrates detail of the armature assembly 150 of FIG. 1 according to certain embodiments. As shown in FIG. 2, armature assembly 150 can include the upper arms 151a, 151b, as well as the relay armature 152. The armature assembly 150 can further include a pivot pin holder 153, configured to connect the upper arms 151a, 151b to a ceramic lower portion 154, as well as to rotate about the pivot pin 155. Spot welding, or any other desired connecting technique, can be used to make such connection.

The relay armature 152 is shown as two movable blades, although in certain embodiments, only one movable blade may be present, or more than two movable blades may be present. The movable blades may be attached to the ceramic lower portion 154 using, for example, rivets (not shown) or any other desired connecting technique.

Figure 3:
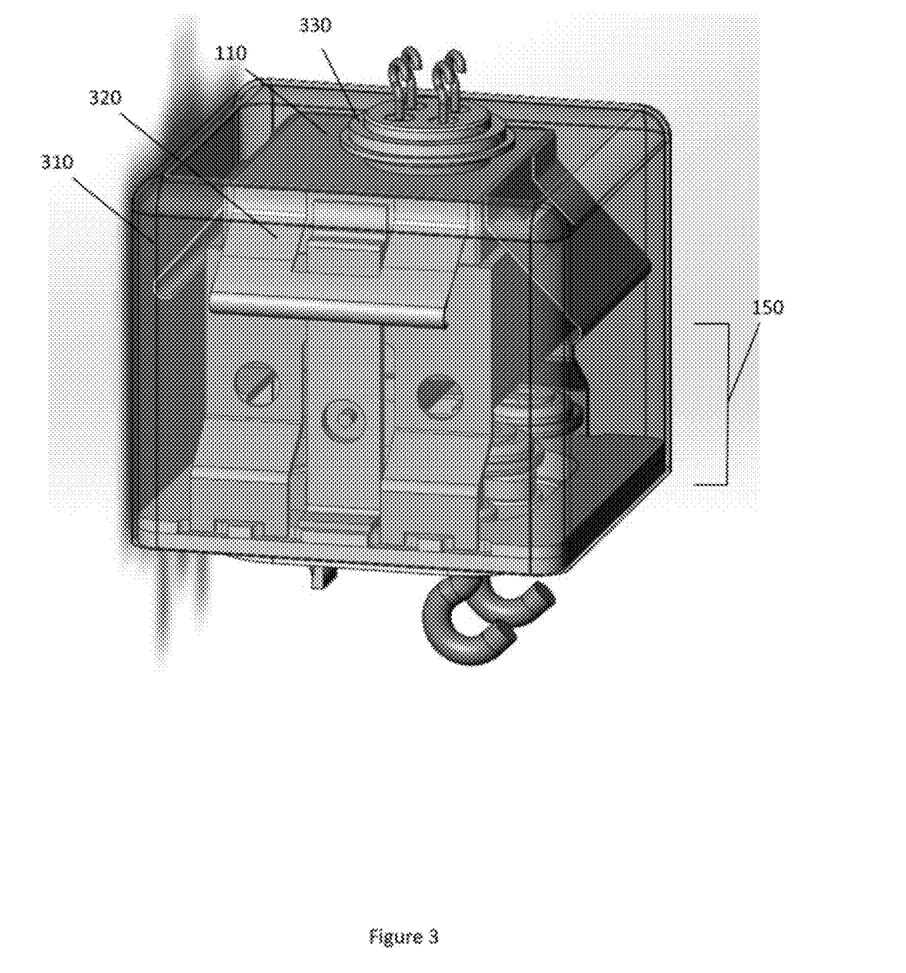
FIG. 3 illustrates another apparatus according to certain embodiments.

FIG. 3 illustrates another apparatus according to certain embodiments. The apparatus of FIG. 3 can include an apparatus such as that shown in FIG. 1 within it. The apparatus can include a relay box 310. The relay box 310 can contain the coil box 110, the armature assembly 150, and a switch cavity surrounding the armature assembly 150.

The coil box 110 can be sealed with nitrogen at 1 atmosphere (or with any other desired gas or pressure) or with vacuum. The relay box 310 can be vacuum sealed. Sealing of the coil box with nitrogen or vacuum can prevent oxidation of the coil wires and connections inside the coil box. Sealing the coil box can prevent any outgassing from coils 120a, 120b from contaminating the high voltage relay, including armature assembly 150.

The relay box 310 can be connected to the coil box 110 by a ring 330 provided between the coil box 110 and the relay box 310. The ring 330 can initially be separate from coil box 110 and relay box 310. Ring 330 can then be inserted between the coil box 110 and the relay box 310 and then welded or otherwise joined to each of them.

Figure 4A:
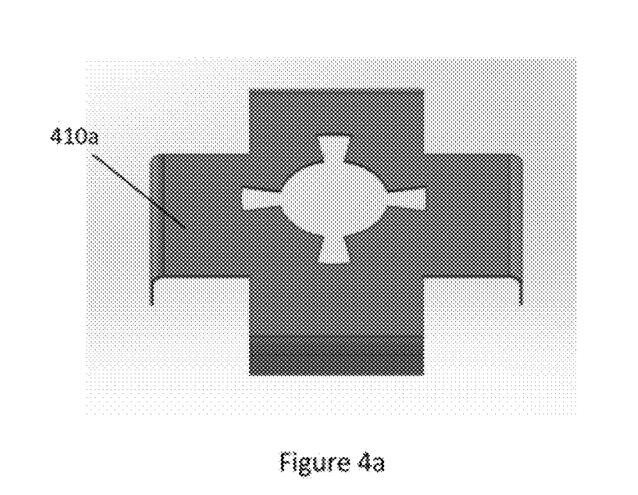
FIGS. 4a, 4b, and 4c illustrate several alternatives for spring supports, according to certain embodiments.
Figure 4B:
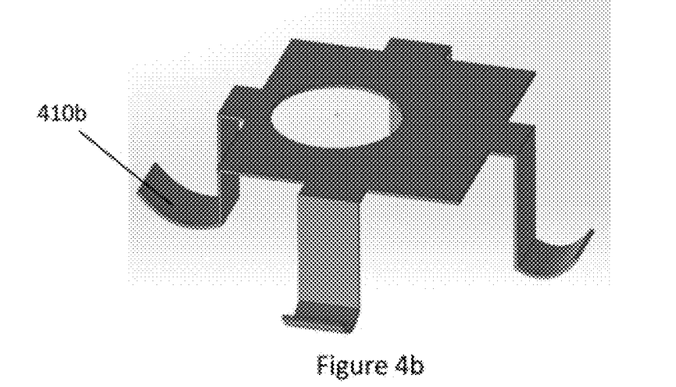
Figure 4C:
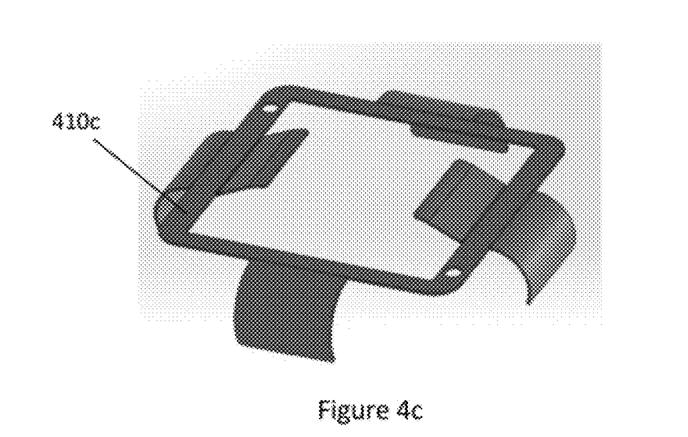

The coil box 110 can be supported within the relay box 310 using spring 320 or any other desired support structure. FIGS. 4a, 4b, and 4c illustrate several alternatives for spring supports, according to certain embodiments. As shown in FIGS. 4a, 4b, and 4c, there can be a variety of possible shapes for springs 410a, 410b, and 410c. These springs can be built into, attached to, or pressed against coil box 110 (as shown in FIG. 3). These springs can be configured to enhance the survivability of a coil box 110 and limit armature and contacts movement under shock pulses (e.g., 0.5 ms, 500 Gs or any other shock pulse of interest) and a sine (or any other periodic source) vibration (e.g., 20 Gs or any other frequency of interest over 100 Hz to 2000 Hz or any other frequency range of interest).

Figure 5A:
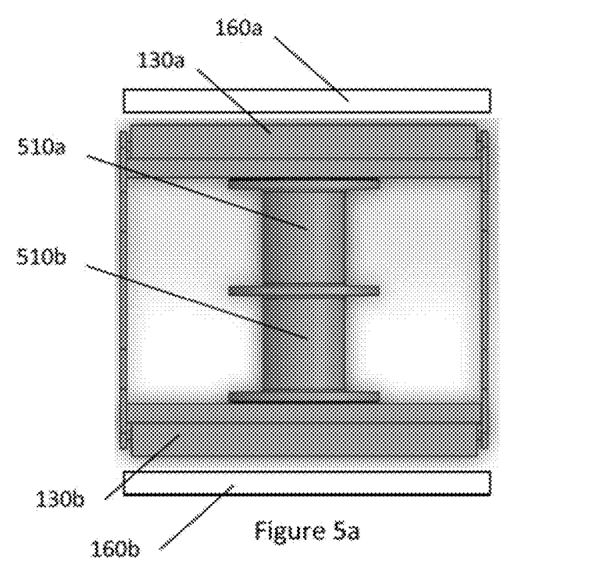
FIGS. 5a and 5b illustrate coil assemblies according to certain embodiments.
Figure 5B:
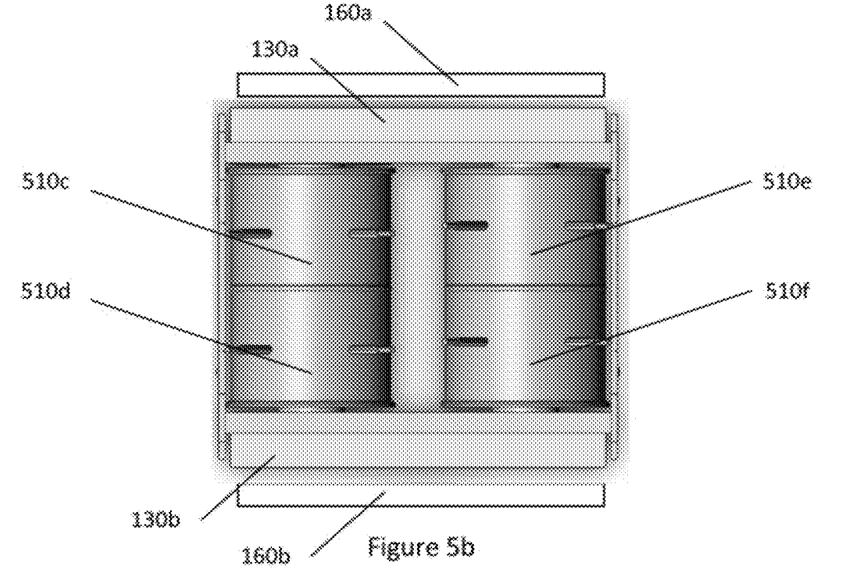

FIGS. 5a and 5b illustrate coil assemblies according to certain embodiments. As shown in FIG. 5a, in certain embodiments two coils 510a, 510b can be employed. Alternatively, in FIG. 5b, in certain embodiments four coils 510c, 510d, 510e, and 510f can be employed. Any other desired coil arrangements and embodiments could be employed. The embodiment in FIG. 5b may permit more even distribution of the magnetic field from inside pole pieces 130a, 130b to outside pole pieces 160a, 160b.

Figure 6:
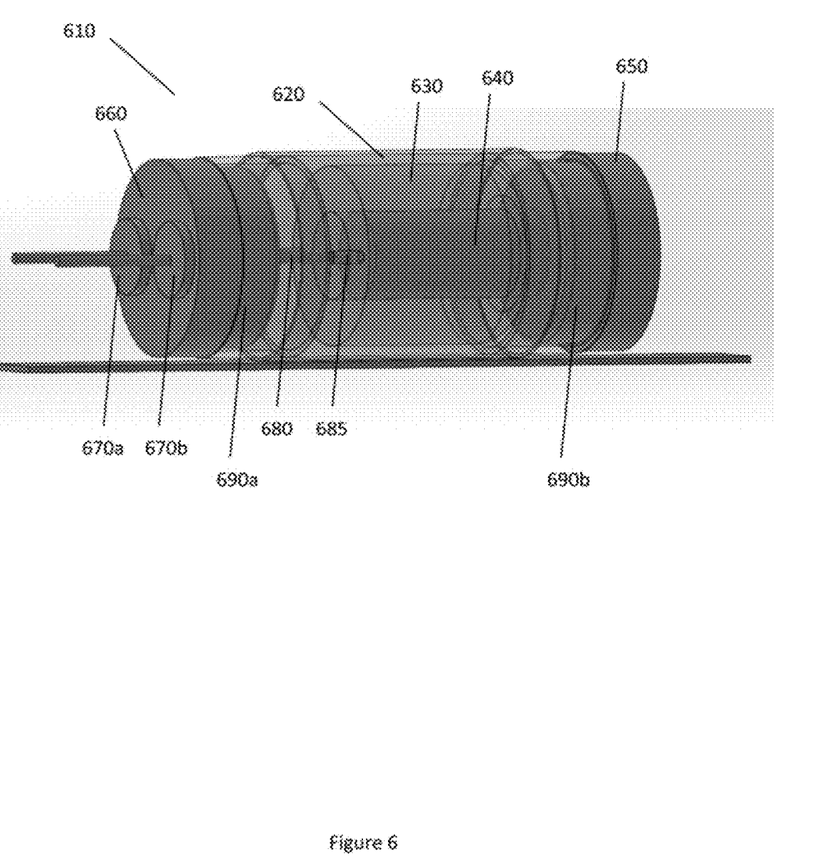
FIG. 6 illustrates a getter assembly according to certain embodiments.

A relay box switch cavity, such as the switch cavity of relay box 310 in FIG. 3, can also include a getter assembly. FIG. 6 illustrates a getter assembly according to certain embodiments. Getters are devices arranged so that when heated, they absorb gas molecules, outgassing from internal relay components, leaks through welds or other joints, or permeation through metal or other barriers. Conventional sintered getters do not stand up well to strong shock and vibration, particularly those described above, and result in partial disintegration of the getter. This partial disintegration of the conventional sintered getter can result in contamination of the switch cavity, and any particles that may be released via the breakup or disintegration of the getter body which is a sintered metal component can work their way into the pivoting mechanism and cause binding or seizing of the mechanism.

The getter can be arranged to absorb a virtual leak of gas molecules into the switch cavity through weld joints or permeating through relay case metal walls. Leaks can occur through imperfect joints/welds, glass-to-metal and ceramic-to-metal seals. Leaks can also occur from outside environment gases diffusion and permeation through relay enclosure walls. Furthermore, there can be leaks by the internal components, such as coil and wires from within coil box into the switch cavity through weld joints and walls of the coil box. In addition to being configured to absorb these and other gasses, the getter can further be arranged to survive shock and vibration without releasing particles into the switch cavity of the sealed relay box. The term virtual leak, as used herein, means that the device passes a leak test, however over time eventual leaks occur whether through weld joint, braze joints, metal to glass seals, or other imperfect seals, via permeation through case metal walls, or eventual outgassing of pockets of gas molecules trapped within metal lattice crystal layers and microstructures.

Additionally, the getter can be activated after a vacuum pump-down, in order to pull down the vacuum level by an order of magnitude. Thus, the getter can be used to enhance the level of vacuum within the switch cavity of a sealed and pumped-down relay box.

As shown in FIG. 6, getter 610 can include screen body 620. Screen body 620 can be configured to have openings that may be approximately 2 microns, although such openings may comprise any other desired size. For example, screen body 620 can be configured to permit gas molecules to enter without permitting 3 micron particles to escape the getter 610. Screen body 620 can be made of two or more layers of cascaded screen, with the openings of 2 microns reflecting the combination of layers. Individually, the layers may have openings of 4 microns. The layers may be sintered together with a 2 micron offset, such that the combined layers have 2 micron openings.

The getter assembly 610 can be configured to remove outgassing within a switch cavity. Furthermore, the getter assembly 610 can be contained specifically within a switch cavity of a relay box (not shown in FIG. 6).

The getter assembly 610 can be configured to secure and protect the getter during shock and vibration. For example, the screen body 620 can be made up of multiple layers and there can be other features, such as a guard 630 within the getter assembly 610, which may help to protect an absorption element 640.

The absorption element 640 and guard 630, if used, can be joined with an end member 650 to form a plunger. The plunger can be configured to enhance the survivability of the absorption element 640 and of the getter assembly 610 under shock pulses (e.g., 0.5 ms, 500 Gs or any other shock pulse of interest) and a sine (or any other periodic source) vibration (e.g., 20 Gs or any other frequency of interest over 100 Hz to 2000 Hz or any other frequency range of interest).

A cap unit 660 can be provided with one or more terminals 670a, 670b to permit electrical connection of the getter assembly 610. The electrical connection can permit the getter assembly 610 to be heated internally using heating element 680. The heating element 680 can cause the absorption element 640 to absorb gasses.

The plunger can also include center pin 685, which can be configured to pass through a center hole of the absorption element 640. The center pin 685 can also be employed in the heating of the absorption element 640. The center pin 685 can support absorption element 640 and may prevent motion thereof under shock and vibration.

Thus, the getter assembly 610 can include an absorption element 640, which may be a sintered metal getter or any other desired absorption element. The assembly can also include a heating element 680 configured to heat the absorption element 640. The getter assembly 610 can also include an enclosure surrounding the absorption element 640 and the heating element 680. The enclosure can include the screen body 620, which may be a stainless steel mesh having a two (or any other desired size) micron hole size. The enclosure can be configured to permit the entry of gas and configured to prohibit the release of particles larger than, for example, three microns. Thus, any particles caused by a partial collapse of absorption element 640 due to shock and vibration can be contained by screen body 620 and can be prevented from contaminating the armature assembly.

More particularly, in certain embodiments the screen body 620 can be configured to permit the entry of gas and configured to prohibit the release of fragments of the sintered metal getter 640 during a build process and when exposed to high shock and vibration environments, such as those described herein.

The sintered metal absorption element 640 can be configured to absorb outgassing of components of a switch cavity within the relay box. The absorption element 640 can also or additionally be configured to absorb gas remaining after vacuum sealing of a relay box containing the getter.

The absorption element 640 can have a generally cylindrical or any other desired shape. For example, the shape of the absorption element 640 may be cylindrical except for a hole through the absorption element 640, and setting aside any minor manufacturing irregularities or imperfections, such as rounded corners and the like.

A gap between an outer wall of the absorption element 640 and an inner wall of the cylindrically shaped mesh may be less than or equal to 0.005 inches. Other spacings are also permitted.

The stainless steel mesh can be a cascaded and sintered mesh surrounding the absorption element 640. Cascaded and sintered here can refer to a manufacturing process whereby two sheets of stainless steel mesh are offset from one another and then sintered together.

The apparatus can also include a first ring assembly 690a. The first ring assembly 690a can be braze sealed to the stainless steel cylindrical mesh and can provide for a seamless laser weld of cap unit 660, which may be a stainless steel plug with two feed through holes configured to permit passage of electrical contacts from a first end of the first ring assembly to the heating element 680 of the absorption element 640.

The apparatus can further include a second ring assembly 690b braze sealed to a second end of the cylindrically shaped mesh.

As mentioned above, a center pin 685, which may be a stainless steel pin, can be secured to a face of a stainless steel plug of end member 650. The stainless still pin can be secured by laser weld into the second ring assembly 690b facing the absorption element 640. The center pin can be configured to mate with a center hole of the generally cylindrically shaped absorption element 640. The center pin 685 can be sized so as to extend from a first end of the absorption element 640 to a second end of the absorption element 640. Furthermore, the center pin assembly can be secured to a first end of the cylindrical shaped mesh.

The center pin can be configured to hold in place and limit disintegration of the sintered metal getter under shock and vibration. This may be accomplished by, among other things, appropriately sizing the center pin with reference to the sintered metal getter.

The cylindrically shaped mesh can be brazed at a first end to a first interim ring and brazed at a second end to a second interim ring. The first interim ring can be welded to the first feed through the stainless steel plug assembly and the second interim ring can be laser welded to the second plug and pin assembly.

The gap between an inner wall of the absorption element 640 and an outer wall of the center pin may be less than or equal to 0.005 inches or any other desired limit. This may be one of the ways by which the center pin may help to limit damage to the absorption element 640 due to shock and vibration.

Figure 7A:
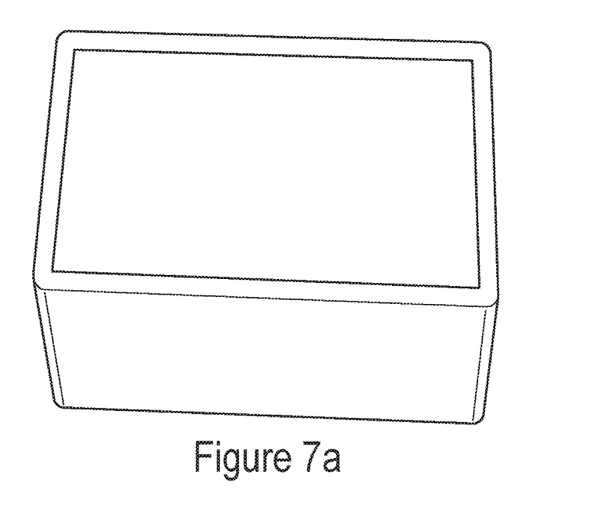
FIGS. 7a and 7b illustrate alternative getter assemblies according to certain embodiments.
Figure 7B:
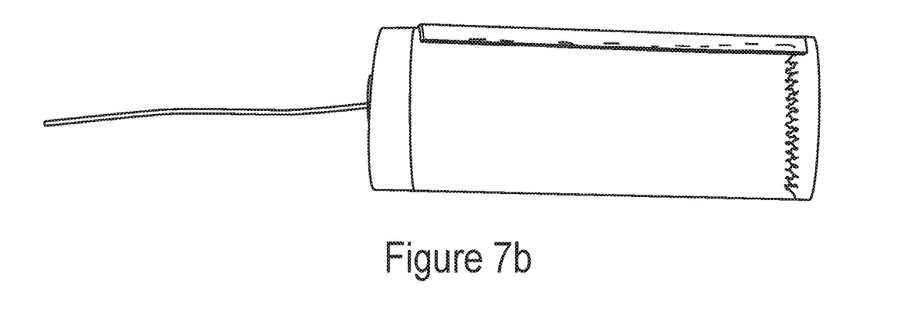

FIGS. 7a and 7b illustrate alternative getter assemblies according to certain embodiments. FIG. 7a illustrates a box-shaped assembly. As shown in FIG. 7a, in certain embodiments one or more side of the assembly may be provided with a screen body, and these screen bodies may be welded to one another or to a box frame at the edge of the getter assembly.

Alternatively, as shown in FIG. 7b, the getter assembly may be cylindrical and the cylinder wall may be a single screen body that is welded, or otherwise joined to itself or to a lengthwise frame member. Alternatively, the screen body may be manufactured as a single cylindrical member.

Figure 8:
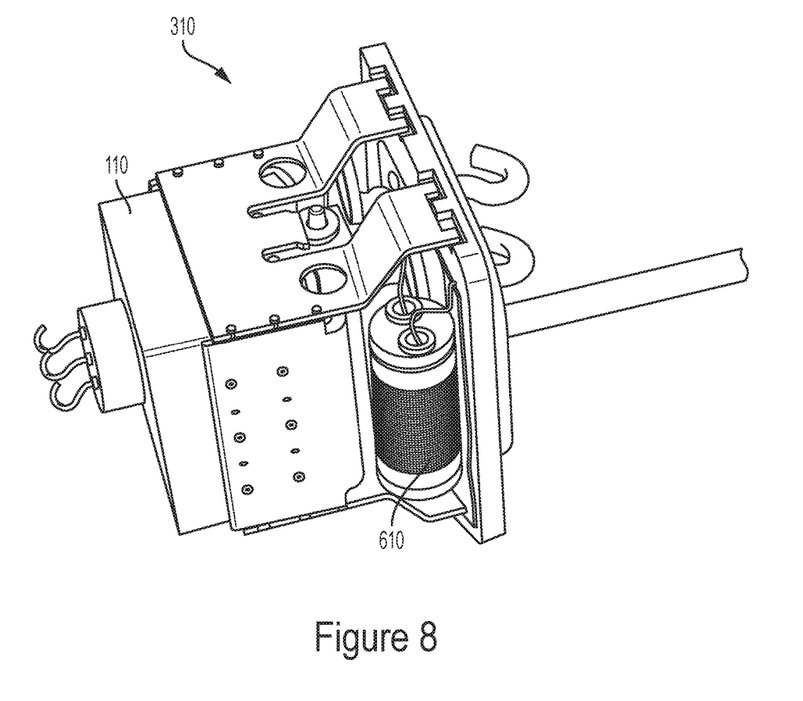
FIG. 8 illustrates the position of a getter assembly within a relay box, according to certain embodiments.

FIG. 8 illustrates the position of a getter assembly 610 within a relay box, according to certain embodiments. As shown in FIG. 8, the getter assembly 610 may be located within the switch cavity of relay box 310. Although multiple positions are possible, the getter assembly 610 in this case is shown along one wall of the relay box 310. The other walls of relay box 310 are not shown, for ease of viewing.

Figure 9:
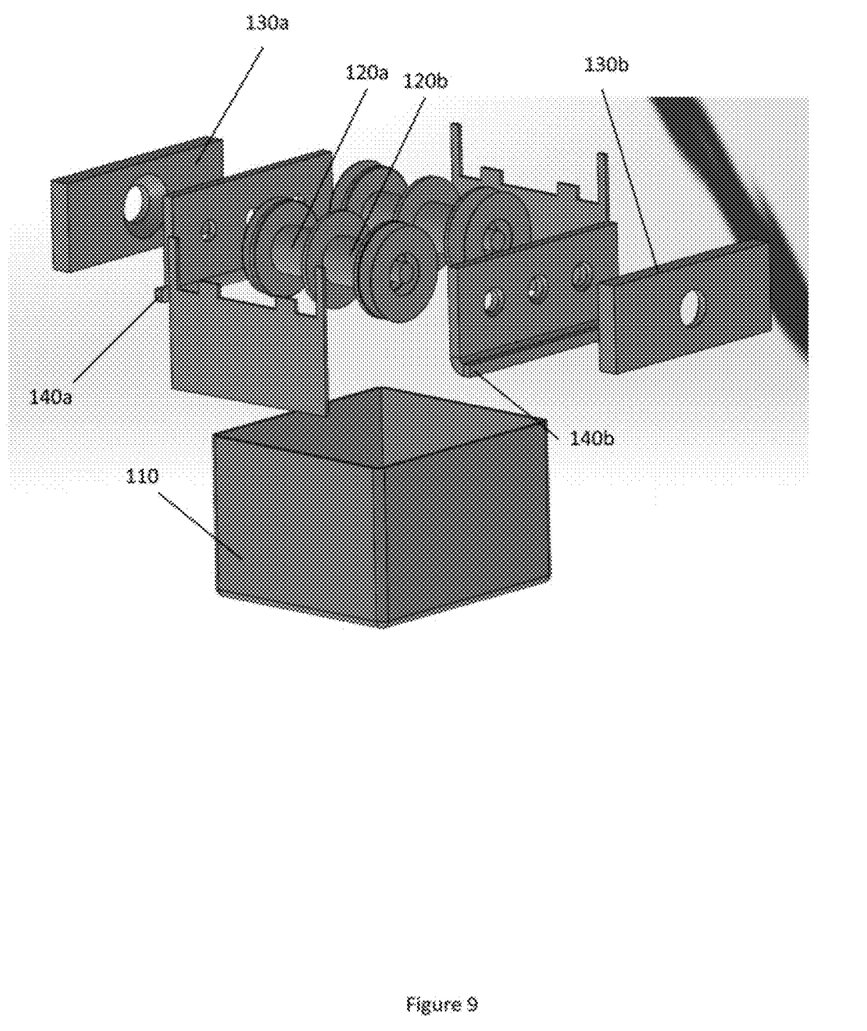
FIG. 9 illustrates an exploded view of a coil box according to certain embodiments.

FIG. 9 illustrates an exploded view of a coil box according to certain embodiments. FIG. 9 illustrates one way to assemble a coil box 110 including coils 120a, 120b, inside pole pieces 130a, 130b, permanent magnets 140a, 140b. Other assembly techniques and arrangements are also permitted.

Figure 10:
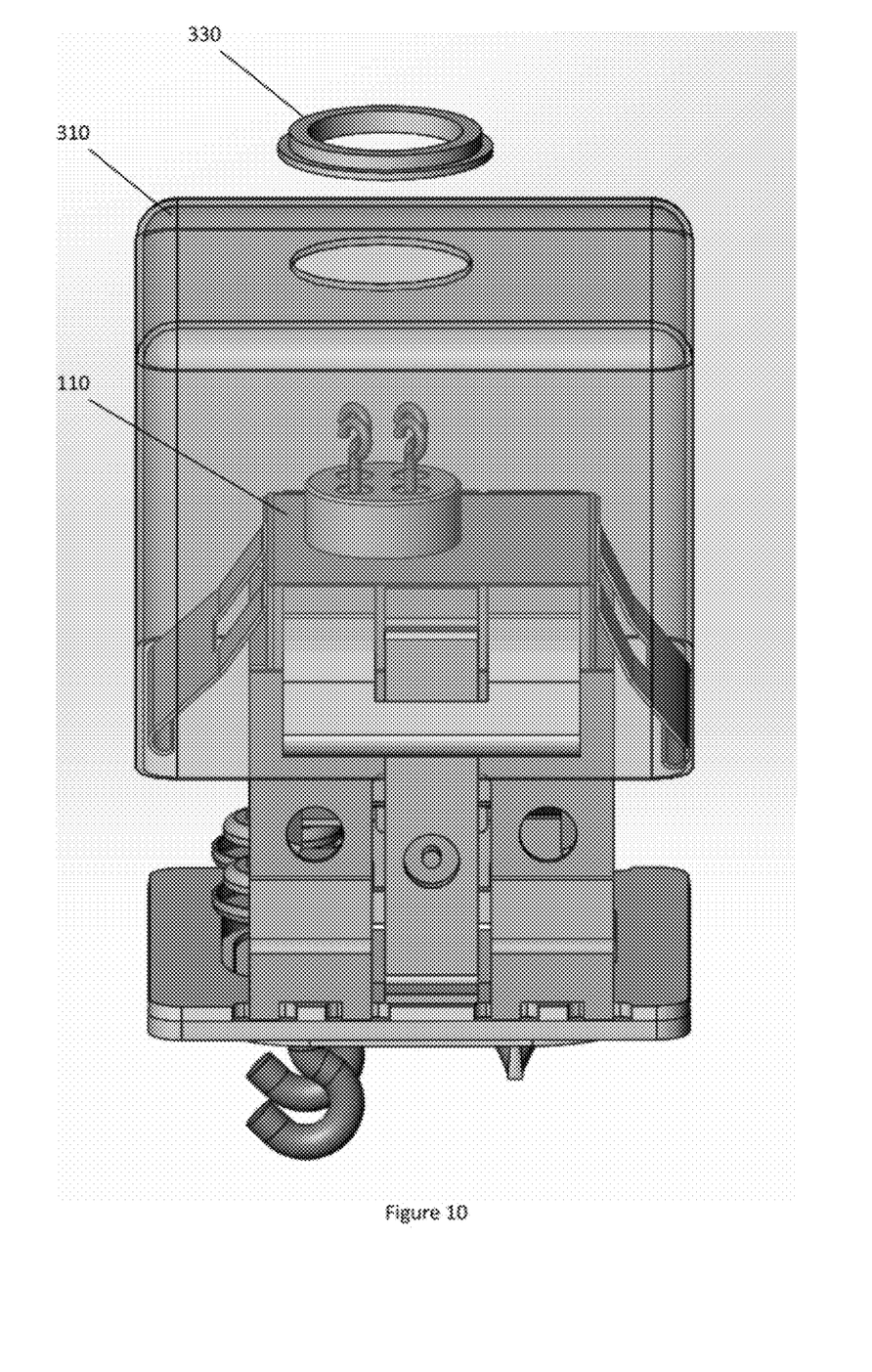
FIG. 10 illustrates a partially exploded view of a relay box according to certain embodiments.

FIG. 10 illustrates a partially exploded view of a relay box according to certain embodiments. As shown in FIG. 10, a coil box 110 can be connected to relay box 310 using a ring 330. The ring 330 can be welded to both the coil box 110 and the relay box 310. The ring 330 may permit the manufacturing tolerances of the coil box 110 and the relay box 310 to be less exact, while still permitting a reliable seal to be made between the boxes.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. An apparatus, comprising:
   a coil box containing coils, inside pole pieces, and permanent magnets, wherein the coils, inside pole pieces, and permanent magnets are configured to actuate an armature assembly external to the coil box, and the coils, inside pole pieces, and permanent magnets are completely contained within the coil box;
   outside pole pieces disposed externally to the coil box and separate from the internal pole pieces configured to move a relay armature of the armature assembly responsive to energizing of the coils, wherein moving the relay armature comprises overcoming a latching of at least one of the permanent magnets; and
   a relay box, wherein the coil box, the armature assembly, and a switch cavity are contained in the relay box.

2. The apparatus of claim 1, wherein each outside pole piece is configured to operate with a gap between the outside pole piece and the relay armature.

3. The apparatus of claim 1, wherein the outside pole pieces and inside pole pieces within the coil box are configured to actuate a movable contact of the armature assembly.

4. The apparatus of claim 1, wherein the coil box is configured to limit motion of the armature assembly.

5. The apparatus of claim 1, wherein the outside pole pieces are each attached to at least one exterior wall of the coil box.

6. The apparatus of claim 1, wherein the inside pole pieces are each attached to at least one magnetic core of at least one of the coils inside the coil box.

7. The apparatus of claim 1, wherein at least two permanent magnets are secured inside the coil box and in contact with a respective side and bottom face of the coil box.

8. The apparatus of claim 1, wherein coil box is sealed with nitrogen at 1 atmosphere or with vacuum and the relay box is vacuum sealed.

9. The apparatus of claim 1, further comprising:
   a getter assembly configured to remove outgassing within the switch cavity, wherein the getter assembly is contained within the switch cavity.

10. The apparatus of claim 9, wherein the getter assembly is configured such that gas molecules can pass through at least one wall of the getter assembly, and particles of greater than three microns are blocked from escaping the at least one wall of the getter assembly.

11. The apparatus of claim 9, wherein the getter assembly is configured to secure and protect an absorption element during shock and vibration.

12. The apparatus of claim 6, wherein the relay box is connected to the coil box by a ring provided between the coil box and the relay box.

13. An apparatus, comprising:
    a coil box containing coils, inside pole pieces, and permanent magnets, wherein the coils, inside pole pieces, and permanent magnets are configured to actuate an armature assembly external to the coil box, and the coils, inside pole pieces, and permanent magnets are completely contained within the coil box;
    outside pole pieces disposed externally to the coil box and separate from the internal pole pieces configured to move a relay armature of the armature assembly responsive to energizing of the coils, wherein moving the relay armature comprises overcoming a latching of at least one of the permanent magnets, wherein the inside pole pieces are each attached to at least one magnetic core of at least one of the coils inside the coil box; and
    a spring, wherein the spring is provided between the coil box and a relay box and configured to protect the coil box during shock and vibration.

14. The apparatus of claim 1, wherein connections for the coil box follow a first path through a first wall of the relay box, wherein connections for the relay box follow a second path, wherein the second path is separate from the first path.

15. The apparatus of claim 14, wherein the second path is through a second wall of the relay box, different from the first wall.

16. The apparatus of claim 14, wherein the connections for the coil box pass through a ring provided between the coil box and the relay box.

17. The apparatus of claim 16, wherein the connections for the relay box do not pass through the ring provided between the coil box and the relay box.

18. The apparatus of claim 8, wherein the coil box is vacuum sealed and the relay box is vacuum sealed within the coil box.

19. The apparatus of claim 14, wherein the connections for the coil box pass through a flanged ring, the flanged ring arranged to create a seal between the coil box and the relay box.

20. The apparatus of claim 19, wherein the connections for the relay box do not pass through the flanged ring.

* * * * *